(12) United States Patent
Touboul

(10) Patent No.: US 9,781,164 B2
(45) Date of Patent: Oct. 3, 2017

(54) SYSTEM AND METHOD FOR PROVIDING NETWORK SECURITY TO MOBILE DEVICES

(71) Applicant: CUPP Computing AS, Oslo (NO)

(72) Inventor: Shlomo Touboul, Kefar Haim (IL)

(73) Assignee: CUPP Computing AS, Oslo (NO)

( * ) Notice: Subject to any disclaimer, the term of this patent is extended or adjusted under 35 U.S.C. 154(b) by 0 days.

(21) Appl. No.: 15/352,553

(22) Filed: Nov. 15, 2016

(65) Prior Publication Data

US 2017/0230421 A1 Aug. 10, 2017

Related U.S. Application Data

(63) Continuation of application No. 14/092,756, filed on Nov. 27, 2013, now Pat. No. 9,497,622, which is a continuation of application No. 13/735,836, filed on Jan. 7, 2013, now Pat. No. 8,627,452, which is a continuation of application No. 11/376,919, filed on Mar. 15, 2006, now Pat. No. 8,381,297.

(Continued)

(51) Int. Cl.
*G06F 21/00* (2013.01)
*H04L 29/06* (2006.01)

(52) U.S. Cl.
CPC .......... *H04L 63/20* (2013.01); *H04L 63/0263* (2013.01); *H04L 63/145* (2013.01)

(58) Field of Classification Search
CPC ........... G06F 21/56; G06F 21/00; H04L 63/02
See application file for complete search history.

(56) References Cited

U.S. PATENT DOCUMENTS

| | | | |
|---|---|---|---|
| H1944 H | * | 2/2001 | Cheswick et al. .. H04L 63/0236 726/11 |
| 6,286,087 B1 | | 9/2001 | Ito et al. |

(Continued)

FOREIGN PATENT DOCUMENTS

| | | |
|---|---|---|
| WO | 0078008 | 12/2000 |
| WO | 2004030308 | 4/2004 |
| WO | 2007110094 | 10/2007 |

OTHER PUBLICATIONS

Breeden II, John et al., "A Hardware Firewall You Take With You," Government Computer News, located at http://gcn.com/Articles/2005/06/01/A-hardware-firewall-you-take-with-you.aspx?p=1, Jun. 1, 2005.

(Continued)

*Primary Examiner* — Izunna Okeke
(74) *Attorney, Agent, or Firm* — Sheppard, Mullin, Richter & Hampton LLP

(57) ABSTRACT

A small piece of hardware connects to a mobile device and filters out attacks and malicious code. Using the piece of hardware, a mobile device can be protected by greater security and possibly by the same level of security offered by its associated corporation/enterprise. In one embodiment, a mobile security system includes a connection mechanism for connecting to a data port of a mobile device and for communicating with the mobile device; a network connection module for acting as a gateway to a network; a security policy for determining whether to forward content intended for the mobile device to the mobile device; and a security engine for executing the security policy.

18 Claims, 10 Drawing Sheets

Related U.S. Application Data

(60) Provisional application No. 60/750,326, filed on Dec. 23, 2005.

(56) References Cited

U.S. PATENT DOCUMENTS

| | | | |
|---|---|---|---|
| 6,466,779 B1 | 10/2002 | Moles et al. | |
| 6,772,345 B1 | 8/2004 | Shetty | |
| 6,813,682 B2 | 11/2004 | Bress et al. | |
| 7,036,143 B1 | 4/2006 | Leung et al. | |
| 7,065,644 B2 | 6/2006 | Daniell et al. | |
| 7,069,330 B1 | 6/2006 | McArdle et al. | |
| 7,076,690 B1 | 7/2006 | Todd et al. | |
| 7,086,089 B2 | 8/2006 | Hrastar et al. | |
| 7,131,141 B1 | 10/2006 | Blewett et al. | |
| 7,184,554 B2 | 2/2007 | Freese | |
| 7,197,638 B1 | 3/2007 | Grawrock et al. | |
| 7,283,542 B2 | 10/2007 | Mitchell | |
| 7,353,533 B2 | 4/2008 | Wright et al. | |
| 7,359,983 B1 | 4/2008 | Maufer et al. | |
| 7,360,242 B2 | 4/2008 | Syvanne | |
| 7,418,253 B2 | 8/2008 | Kavanagh | |
| 7,539,828 B2 | 5/2009 | Lomnes | |
| 7,657,941 B1 | 2/2010 | Zaitsev | |
| 7,908,476 B2 | 3/2011 | Kandasamy et al. | |
| 7,984,479 B2 | 7/2011 | Brabson et al. | |
| 7,992,199 B1 | 8/2011 | Winick et al. | |
| 8,180,654 B2 | 5/2012 | Berkman et al. | |
| 8,218,449 B2 | 7/2012 | Taylor | |
| 8,218,558 B2 | 7/2012 | Tan et al. | |
| 8,234,261 B2 | 7/2012 | Monahan | |
| 8,239,531 B1 | 8/2012 | Bellovin et al. | |
| 8,321,934 B1 | 11/2012 | Cooley et al. | |
| 8,402,528 B1* | 3/2013 | McCorkendale | G06F 8/65 726/11 |
| 2003/0046397 A1 | 3/2003 | Trace et al. | |
| 2003/0055994 A1 | 3/2003 | Herrmann et al. | |
| 2003/0070084 A1 | 4/2003 | Satomaa et al. | |
| 2003/0097431 A1 | 5/2003 | Dill | |
| 2003/0110391 A1 | 6/2003 | Wolff et al. | |
| 2003/0126468 A1 | 7/2003 | Markham | |
| 2003/0131245 A1 | 7/2003 | Linderman | |
| 2003/0142683 A1 | 7/2003 | Lam et al. | |
| 2003/0224758 A1 | 12/2003 | O'Neill et al. | |
| 2004/0003262 A1 | 1/2004 | England et al. | |
| 2004/0064575 A1 | 4/2004 | Rasheed et al. | |
| 2004/0085944 A1 | 5/2004 | Boehm | |
| 2004/0093520 A1 | 5/2004 | Lee et al. | |
| 2004/0123153 A1* | 6/2004 | Wright | G06F 21/32 726/1 |
| 2004/0177274 A1 | 9/2004 | Aroya | |
| 2004/0203296 A1 | 10/2004 | Moreton et al. | |
| 2004/0210775 A1 | 10/2004 | Gbadegesin | |
| 2004/0237079 A1 | 11/2004 | Cox et al. | |
| 2005/0091522 A1 | 4/2005 | Hearn et al. | |
| 2005/0114711 A1 | 5/2005 | Hesselink et al. | |
| 2005/0149757 A1 | 7/2005 | Corbett et al. | |
| 2005/0208967 A1 | 9/2005 | Buniatyan | |
| 2005/0254455 A1 | 11/2005 | Plehn et al. | |
| 2005/0278544 A1 | 12/2005 | Baxter | |
| 2006/0031940 A1 | 2/2006 | Rozman et al. | |
| 2006/0037071 A1 | 2/2006 | Rao et al. | |
| 2006/0056317 A1 | 3/2006 | Manning et al. | |
| 2006/0059092 A1 | 3/2006 | Burshan et al. | |
| 2006/0064391 A1 | 3/2006 | Petrov et al. | |
| 2006/0074896 A1 | 4/2006 | Thomas et al. | |
| 2006/0075494 A1 | 4/2006 | Bertman et al. | |
| 2006/0075501 A1 | 4/2006 | Thomas et al. | |
| 2006/0085528 A1 | 4/2006 | Thomas | |
| 2006/0161985 A1 | 7/2006 | Zhao | |
| 2006/0224794 A1 | 10/2006 | Stevens | |
| 2006/0242686 A1 | 10/2006 | Toda et al. | |
| 2006/0277405 A1 | 12/2006 | Bowler et al. | |
| 2007/0005987 A1 | 1/2007 | Durham et al. | |
| 2007/0022474 A1 | 1/2007 | Rowett et al. | |
| 2007/0061887 A1 | 3/2007 | Hoover et al. | |
| 2007/0083939 A1 | 4/2007 | Fruhauf et al. | |
| 2007/0097976 A1 | 5/2007 | Wood et al. | |
| 2007/0104197 A1 | 5/2007 | King | |
| 2007/0118874 A1 | 5/2007 | Adams et al. | |
| 2007/0118893 A1 | 5/2007 | Crawford | |
| 2007/0130433 A1 | 6/2007 | Safa | |
| 2007/0130457 A1 | 6/2007 | Kamat et al. | |
| 2007/0143827 A1 | 6/2007 | Nicodemus et al. | |
| 2007/0143851 A1 | 6/2007 | Nicodemus et al. | |
| 2007/0192500 A1 | 8/2007 | Lum | |
| 2007/0192854 A1 | 8/2007 | Kelley et al. | |
| 2007/0199061 A1 | 8/2007 | Byres et al. | |
| 2007/0214369 A1 | 9/2007 | Roberts et al. | |
| 2007/0240217 A1 | 10/2007 | Tuvell et al. | |
| 2007/0261112 A1 | 11/2007 | Todd et al. | |
| 2007/0294744 A1* | 12/2007 | Alessio | H04L 63/1425 726/1 |
| 2008/0034419 A1 | 2/2008 | Mullick et al. | |
| 2008/0066148 A1 | 3/2008 | Lim | |
| 2008/0083037 A1 | 4/2008 | Kruse et al. | |
| 2008/0098478 A1 | 4/2008 | Vaidya et al. | |
| 2008/0109871 A1 | 5/2008 | Jacobs | |
| 2008/0114990 A1 | 5/2008 | Hilbert et al. | |
| 2008/0141349 A1 | 6/2008 | Lyle et al. | |
| 2008/0235755 A1 | 9/2008 | Blaisdell et al. | |
| 2008/0282337 A1 | 11/2008 | Crawford | |
| 2009/0019223 A1 | 1/2009 | Lection et al. | |
| 2009/0106556 A1 | 4/2009 | Hamid | |
| 2009/0165132 A1 | 6/2009 | Jain et al. | |
| 2009/0249465 A1 | 10/2009 | Touboul | |
| 2009/0254993 A1 | 10/2009 | Leone | |
| 2010/0064341 A1 | 3/2010 | Aldera et al. | |
| 2010/0186093 A1 | 7/2010 | Aussel | |
| 2010/0195833 A1 | 8/2010 | Priestley et al. | |
| 2010/0242109 A1 | 9/2010 | Lee | |
| 2010/0251369 A1 | 9/2010 | Grant | |
| 2010/0333088 A1 | 12/2010 | Rogel et al. | |
| 2011/0023118 A1 | 1/2011 | Wright | |
| 2011/0154443 A1 | 6/2011 | Thakur et al. | |
| 2011/0154477 A1 | 6/2011 | Parla et al. | |
| 2011/0182180 A1 | 7/2011 | Riddle | |
| 2011/0264931 A1 | 10/2011 | Chang et al. | |
| 2011/0268106 A1 | 11/2011 | Dalton, Jr. et al. | |
| 2012/0005756 A1 | 1/2012 | Hoefelmeyer et al. | |
| 2012/0054744 A1 | 3/2012 | Singh et al. | |
| 2012/0084831 A1 | 4/2012 | Hu et al. | |
| 2012/0110320 A1 | 5/2012 | Kumar et al. | |
| 2012/0173609 A1 | 7/2012 | Kulaga et al. | |
| 2012/0185846 A1 | 7/2012 | Recio et al. | |
| 2012/0216273 A1 | 8/2012 | Rolette et al. | |
| 2012/0233695 A1 | 9/2012 | Mahaffey et al. | |
| 2012/0239739 A1 | 9/2012 | Manglik et al. | |
| 2012/0240183 A1 | 9/2012 | Sinha | |
| 2012/0240236 A1 | 9/2012 | Wyatt et al. | |
| 2013/0074144 A1 | 3/2013 | Narayanaswamy et al. | |
| 2013/0091534 A1 | 4/2013 | Gilde et al. | |
| 2013/0097659 A1 | 4/2013 | Das et al. | |
| 2013/0097660 A1 | 4/2013 | Das et al. | |
| 2014/0032314 A1 | 1/2014 | Gieseke et al. | |

OTHER PUBLICATIONS

Claessens, Joris et al., "(How) Can Mobile Agents Do Secure Electronic Transactions on Mobile Hosts? A Survey of the Security Issues and the Current Solutions," ACM Transactions on Internet Technology, vol. 3, No. 1, pp. 28-48, Feb. 2001.

CyberGuard Corporation, "Model 1: Wireless Mobile Security Appliance," located at http://support2.cyberguard.com/products/oem/model1.htm, 2005.

Entry, Inc., "CyberGuard Develops a Custom Mobile Security Appliance," SecurityProNews, located at http://www.securitypronews.com/news/securitynews/spn-45-20041007CyberGuardDevelo . . . , Oct. 7, 2004.

Kent, S. et al., "Security Architecture for the Internet Protocol," I.E.T.F. Network Working Group, RFC 4301, pp. 10-11, Dec. 2005.

PMC-Sierra, Inc., "MSP8120 Multi-Service Security Processor," Product Brief, 2007.

(56) References Cited

OTHER PUBLICATIONS

Prevelakis, Vassilis et al., "Drop-In Security for Distributed and Portable Computing Elements," Internet Research: Electronic Networking, Applications and Policy, vol. 13, No. 2, pp. 107-115, located at http://www.cs.columbia.edu/~angelos/Papers/InternetResearch-Final.pdf, 2003.

WatchGuard Technologies, Inc., "Mobile User VPN and PPTP," Internet Security Handbook, copyright 1998-2001, pp. 1-2, located at http://www.watchguard.com/help/lss/41 /handbook/vpn3.htm, believe published Jun. 5, 2003.

ZyXEL Communications Corp., "ZyXEL Releases Worlds First Palm-Sized Portable Personal Firewall for Ultimate Security: ZyWALL P1 Pushes Network Security to the End-Point PC's with Minimum Administration Effort," ZyXEL News, located at http://global.zyxel.com/news/press.php?indexflag=200503l0013432, Mar. 8, 2005.

European Patent Application No. 06821641.5, Examination Report mailed Dec. 16, 2016.

European Patent Application No. 06821641.5, Search Report mailed May 17, 2011.

European Patent Application No. 08847968.8, Search Report mailed Oct. 25, 2011.

European Patent Application No. 13845746.0, Search Report mailed Jun. 7, 2016.

International Application No. PCT/IL2006/001428, International Search Report and Written Opinion mailed Jul. 15, 2008.

International Application No. PCT/IL2008/000740, International Search Report and Written Opinion mailed Nov. 5, 2008.

International Application No. PCT/US2008/055942, International Search Report and Written Opinion mailed Apr. 6, 2009.

International Application No. PCT/US2009/065204, International Search Report and Written Opinion mailed Jan. 13, 2010.

International Application No. PCT/US2013/064161, International Search Report and Written Opinion mailed Apr. 18, 2014.

International Application No. PCT/US2014/045826, International Search Report and Written Opinion mailed Oct. 30, 2014.

International Application No. PCT/US2015/015970, International Search Report and Written Opinion mailed May 28, 2015.

* cited by examiner

SYSTEM AND METHOD FOR PROVIDING NETWORK SECURITY TO MOBILE DEVICES

PRIORITY CLAIM

This application is a continuation of U.S. patent application Ser. No. 14/092,756, filed Nov. 27, 2013 and entitled "System and Method for Providing Network Security to Mobile Devices," now U.S. Pat. No. 9,497,622, which is a continuation of U.S. patent application Ser. No. 13/735,836, filed Jan. 7, 2013 and entitled "System and Method for Providing Network Security to Mobile Devices," now U.S. Pat. No. 8,627,452, which is a continuation of U.S. patent application Ser. No. 11/376,919, filed Mar. 15, 2006 and entitled "System and Method for Providing Network Security to Mobile Devices," now U.S. Pat. No. 8,381,297, which claims priority to U.S. Provisional Patent Application Ser. No. 60/750,326, filed Dec. 13, 2005 and entitled "Personal Security Appliance." All of the above applications are hereby incorporated by reference herein.

TECHNICAL FIELD

This invention relates generally to network security, and more particularly provides a system and method for providing network security to mobile devices.

BACKGROUND

The internet is an interconnection of millions of individual computer networks owned by governments, universities, nonprofit groups, companies and individuals. While the internet is a great source of valuable information and entertainment, the internet has also become a major source of system damaging and system fatal application code, such as "viruses," "spyware," "adware," "worms," "Trojan horses," and other malicious code.

To protect users, programmers design computer and computer-network security systems for blocking malicious code from attacking both individual and network computers. On the most part, network security systems have been relatively successful. A computer that connects to the internet from within an enterprise's network typically has two lines of defense. The first line of defense includes a network security system, which may be part of the network gateway, that includes firewalls, anti-virus, anti-spyware and content filtering. The second line of defense includes individual security software on individual machines, which is not typically as secure as the network security system and is thus more vulnerable to attacks. In combination, the first and second lines of defense together provide pretty good security protection. However, when a device connects to the internet without the intervening network security system, the device loses its first line of defense. Thus, mobile devices (e.g., laptops, desktops, PDAs such as RIM's Blackberry, cell phones, any wireless device that connects to the internet, etc.) when traveling outside the enterprise network are more vulnerable to attacks.

FIG. 1 illustrates an example network system 100 of the prior art. Network system 100 includes a desktop 105 and a mobile device 110, each coupled to an enterprise's intranet 115. The intranet 115 is coupled via a network security system 120 (which may be a part of the enterprise's gateway) to the untrusted internet 130. Accordingly, the desktop 105 and mobile device 110 access the internet 130 via the network security system 120. A security administrator 125 typically manages the network security system 120 to assure that it includes the most current security protection and thus that the desktop 105 and mobile device 110 are protected from malicious code. Demarcation 135 divides the trusted enterprise 140 and the untrusted public internet 130. Because the desktop 105 and the mobile device 110 are connected to the internet 130 via the network security system 120, both have two lines of defense (namely, the network security system 120 and the security software resident on the device itself) against malicious code from the internet 130. Of course, although trusted, the intranet 115 can also be a source of malicious code.

FIG. 2 illustrates an example network system 200 of the prior art, when the mobile device 110 has traveled outside the trusted enterprise 140 and reconnected to the untrusted internet 130. This could occur perhaps when the user takes mobile device 110 on travel and connects to the internet 130 at a cybercafe, at a hotel, or via any untrusted wired or wireless connection. Accordingly, as shown, the mobile device 110 is no longer protected by the first line of defense (by the network security system 120) and thus has increased its risk of receiving malicious code. Further, by physically bringing the mobile device 110 back into the trusted enterprise 140 and reconnecting from within, the mobile device 110 risks transferring any malicious code received to the intranet 115.

As the number of mobile devices and the number of attacks grow, mobile security is becoming increasingly important. The problem was emphasized in the recent Info-Security Conference in New York on Dec. 7-8, 2005. However, no complete solutions were presented.

There is a need for personal security appliances capable of providing levels of network security as provided by enterprise network security systems.

SUMMARY

An embodiment of the present invention uses a small piece of hardware that connects to a mobile device and filters out attacks and malicious code. The piece of hardware may be referred to as a "mobile security system" or "personal security appliance." Using the mobile security system, a mobile device can be protected by greater security and possibly by the same level of security offered by its associated corporation/enterprise.

In an embodiment, a mobile security system includes a connection mechanism for connecting to a data port of a mobile device and for communicating with the mobile device; a network connection module for acting as a gateway to a network; a security policy for determining whether to forward content intended for the mobile device to the mobile device; and a security engine for executing the security policy.

The connection mechanism may include at least one of a USB connector, a PCMCIA connector, an Ethernet connector, and a BlueTooth communication module. The network connection module may include a network interface card that implements WiFi, WiMAX, GPRS, GSM, UMTS, CDMA, Generation 3, other cell phone internet connection protocols, etc. The security engine may include at least one of an antivirus engine, an antispyware engine, a firewall engine, an IPS/IDS engine, a content filtering engine, a multilayered security monitor, a bytecode monitor, and a URL monitor. The security policy may perform weighted risk analysis based on content type, content source, content category, or historical actions of the user. The remote management module may be capable of receiving security policy updates, security engine updates, and security data updates (including malicious content signatures). The mobile security system may include a distribution module capable of forwarding updates to other mobile security systems, and/or a backup module capable of storing at least a portion of the boot sector of the mobile device should the boot sector of the mobile device become compromised. The mobile security system may include a remote configuration module capable of communicating with a wizard, the wizard being in communication with an enterprise network security system, the wizard capable of substantially automatic generation of policies and data based on the policies and data on the enterprise network security system, the remote configuration module capable of installing the policies and data generated by the wizard. The mobile security system may include a preboot memory that is not accessible during runtime, the preboot memory storing a copy of at least a portion of the operating system of the mobile security system, the mobile security system being configured to load the operating system portion every time the mobile security system is rebooted.

In another embodiment, a method comprises receiving a network connection request from a mobile device outside of a trusted network; acting as a gateway to a network on behalf of the mobile device; receiving information intended for the mobile device from the network; and determining whether to forward the information to the mobile device in accordance with a security policy.

In another embodiment, a mobile security system comprises means for acting as a gateway to a network on behalf of a mobile device outside of a trusted network; receiving information intended for the mobile device from the network; and determining whether to forward the information to the mobile device in accordance with a security policy.

In yet another embodiment, a method comprises receiving internet traffic on a mobile device via a wireless connection; redirecting the internet traffic at the kernel level to a mobile security system; scanning the internet traffic for violations of a security policy; cleaning the internet traffic of any violations of the security policy to generate cleaned internet traffic; and sending the cleaned internet traffic to the mobile device for execution.

In still another embodiment, a system comprises a wireless network interface card on a mobile device for receiving internet traffic; a kernel-level redirector on the mobile device for redirecting the internet traffic at the kernel level to a mobile security system; a security engine for scanning the internet traffic for violations of a security policy and for cleaning the internet traffic of any violations of the security policy to generate cleaned internet traffic; and a connection mechanism for receiving the redirected internet traffic from the kernel-level redirector and for sending the cleaned internet traffic to the mobile device for execution.

DETAILED DESCRIPTION

The following description is provided to enable any person skilled in the art to make and use the invention, and is provided in the context of a particular application and its requirements. Various modifications to the embodiments may be possible to those skilled in the art, and the generic principles defined herein may be applied to these and other embodiments and applications without departing from the spirit and scope of the invention. Thus, the present invention is not intended to be limited to the embodiments shown, but is to be accorded the widest scope consistent with the principles, features and teachings disclosed herein.

An embodiment of the present invention uses a small piece of hardware that connects to a mobile device and filters out attacks and malicious code. The piece of hardware may be referred to as a "mobile security system" or "personal security appliance." Using the mobile security system, a mobile device can be protected by greater security and possibly by the same level of security offered by its associated corporation/enterprise.

Figure 1:
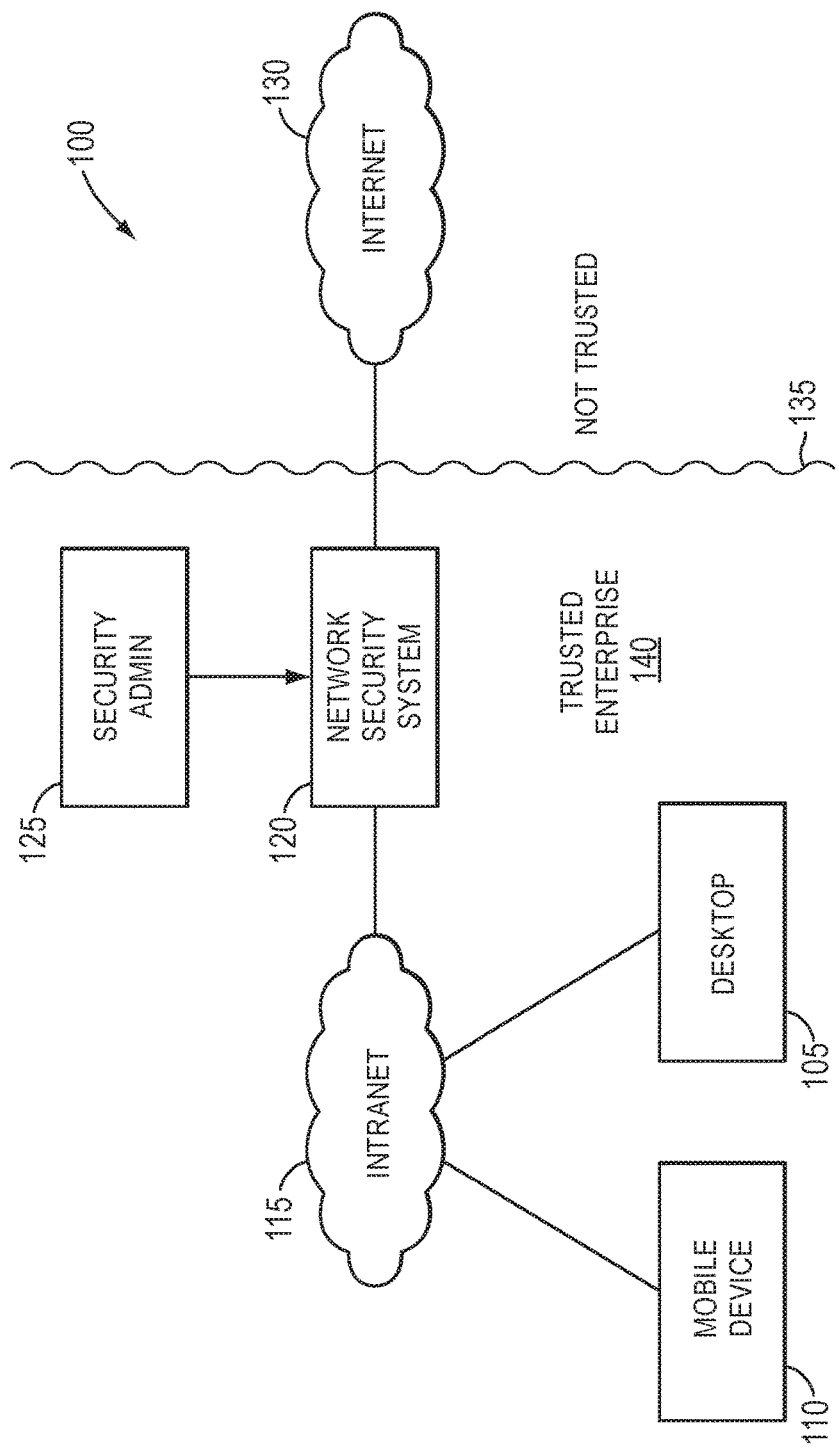
FIG. 1 is a block diagram of a prior art network system in a first state.
Figure 2:
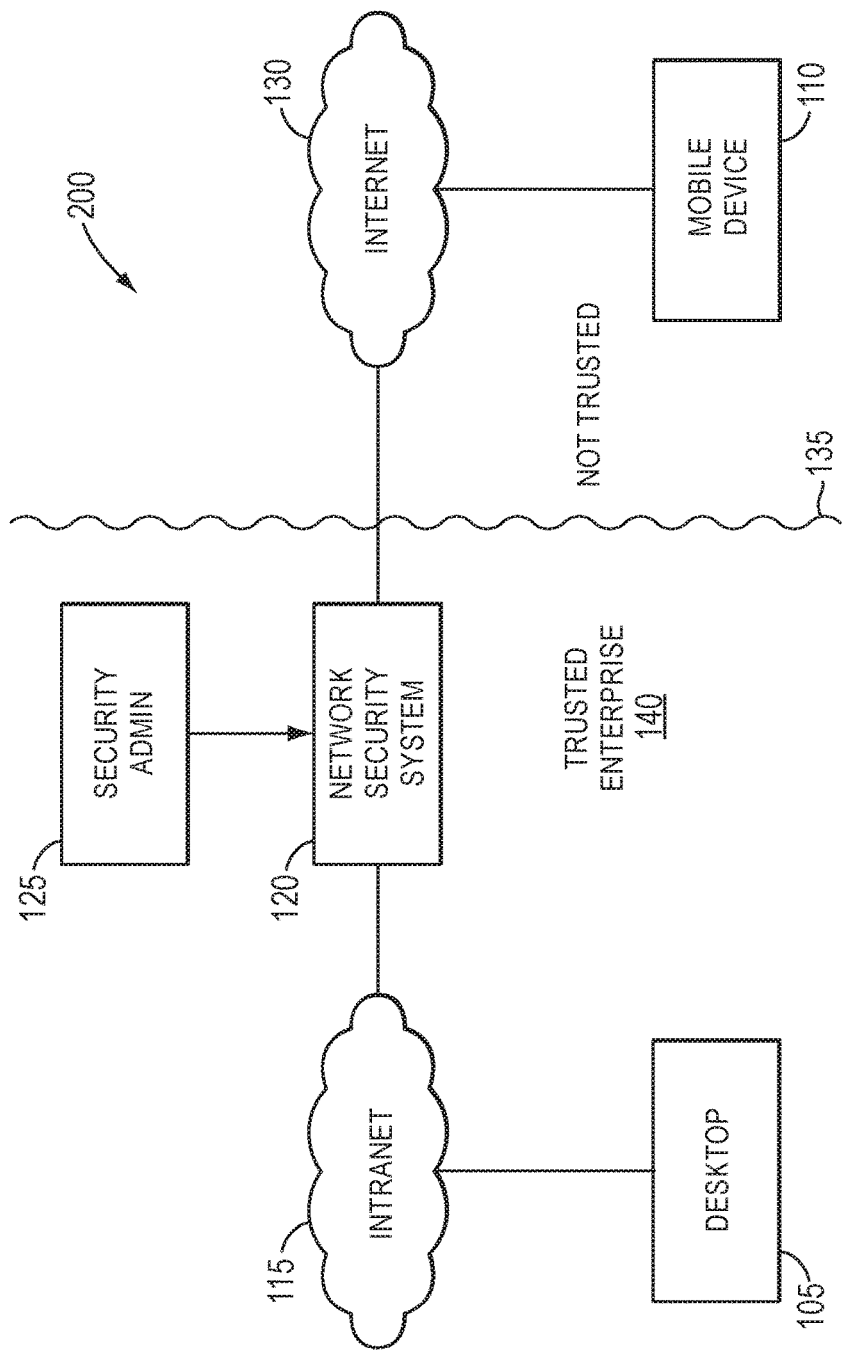
FIG. 2 is a block diagram of a prior art network system in a second state.
Figure 3:
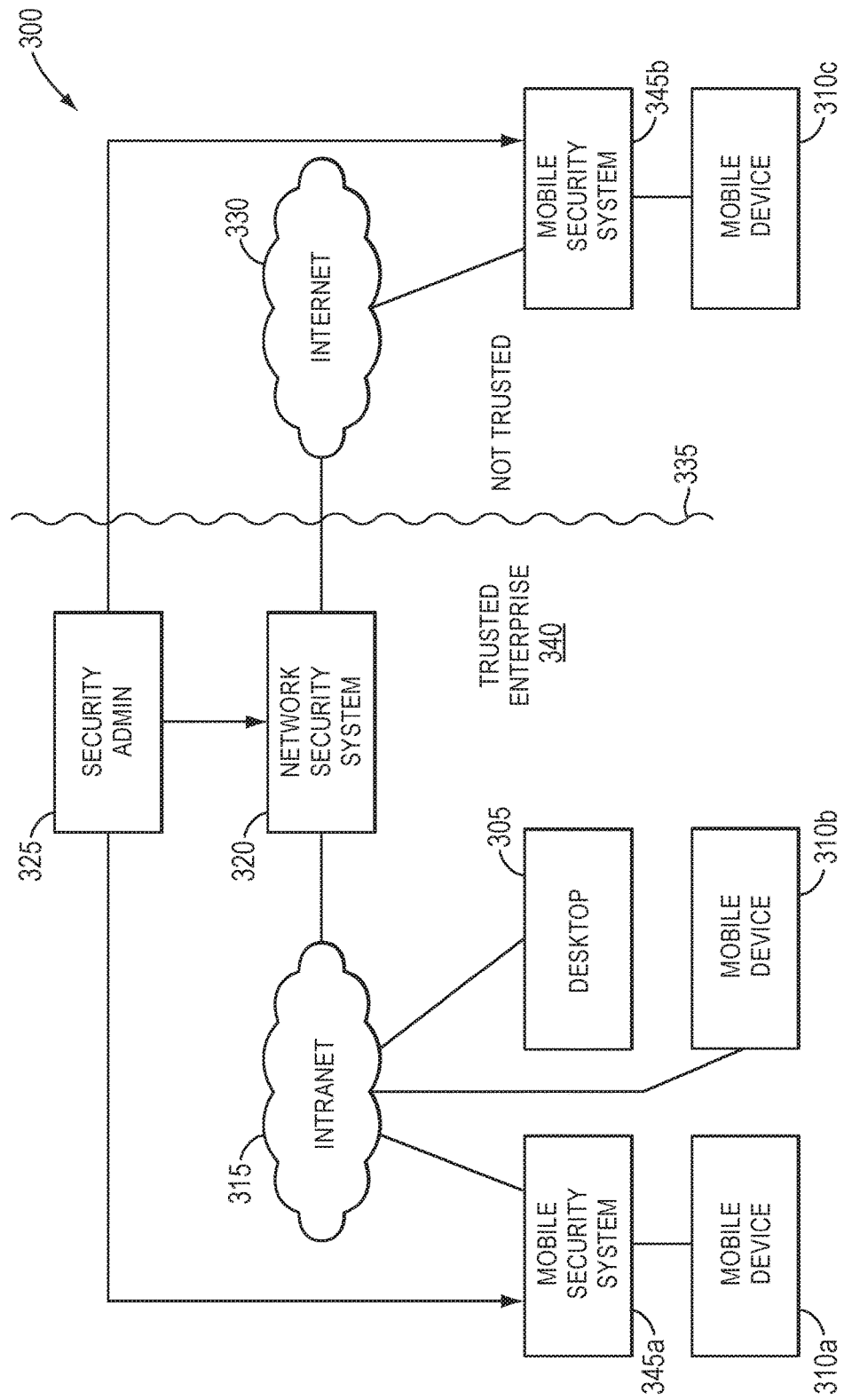
FIG. 3 is a block diagram of a network system in accordance with an embodiment of the present invention.

FIG. 3 illustrates a network system 300 in accordance with an embodiment of the present invention. Network system 300 includes a desktop 305, a first mobile device 310a, and a second mobile device 310b. The first mobile device 310a is illustrated as within the enterprise network 340 at this time and is coupled via a mobile security system 345a to the enterprise's intranet 315. The desktop 305 and second mobile device 310b are also within the enterprise network 340 but in this embodiment are coupled to the intranet 315 without an intervening mobile security system 345 such as mobile security system 345b. The intranet 315 is coupled via a network security system 320 (which may be part of the enterprise's gateway) to the untrusted internet 330. Accordingly, the first mobile device 310a, the second mobile device 310b and the desktop 305 access the untrusted internet 330 via the network security system 320. Each may also be protected by a personal security system resident thereon (not shown). A third mobile device 310c is currently outside the enterprise network 340 and is coupled via a mobile security system 345b to the untrusted internet 330. The third mobile device 310 may be in use by an employee of the trusted enterprise 340 who is currently on travel. A security administrator 325 manages the mobile security system 345a, the mobile security system 345b, and the network security system 320 to assure that they include the most current security protection. One skilled in the art will recognize that the same security administrator need not manage the various devices. Further, the security administrator could be the user and need not be within the trusted enterprise 340.

Demarcation 335 divides the trusted enterprise 340 and the untrusted publicly accessible internet 330. Each of mobile device 310a, 310b and 310c may be referred to generically as mobile device 310, although they need not be identical. Each mobile security system 345a and 345b may be referred to generically as mobile security system 345, although they need not be identical.

As shown, although the mobile device 310c has traveled outside the trusted enterprise 340, the mobile device 310c connects to the untrusted internet 330 via the mobile security system 345b and thus retains two lines of defense (namely, the mobile security system 345b and the security software resident on the device itself). In this embodiment, the mobile security system 345 effectively acts as a mobile internet gateway on behalf of the mobile device 310c. In an embodiment, the mobile security system 345 may be a device dedicated to network security. In an embodiment, each mobile security system 345 may support multiple mobile devices 310, and possibly only registered mobile devices 310, e.g., those belonging to enterprise 340.

Each mobile security system 345 (e.g., 345a, 345b) may be a miniature server, based on commercial hardware (with Intel's Xscale as the core), Linux OS and network services, and open-source firewall, IDS/IPS and antivirus protection. The mobile security system 345 may be based on a hardened embedded Linux 2.6.

In this embodiment, because the security administrator 325 is capable of remotely communicating with the mobile security system 345b, IT can monitor and/or update the security policies/data/engines implemented on the mobile security system 345b. The security administrator 325 can centrally manage all enterprise devices, remotely or directly. Further, the security administrator 325 and mobile security systems 345 can interact to automatically translate enterprise security policies into mobile security policies and configure mobile security systems 345 accordingly. Because the mobile security system 345 may be generated from the relevant security policies of the enterprise 340, the mobile device 310c currently traveling may have the same level of protection as the devices 305/310 within the trusted enterprise 340.

Figure 8:
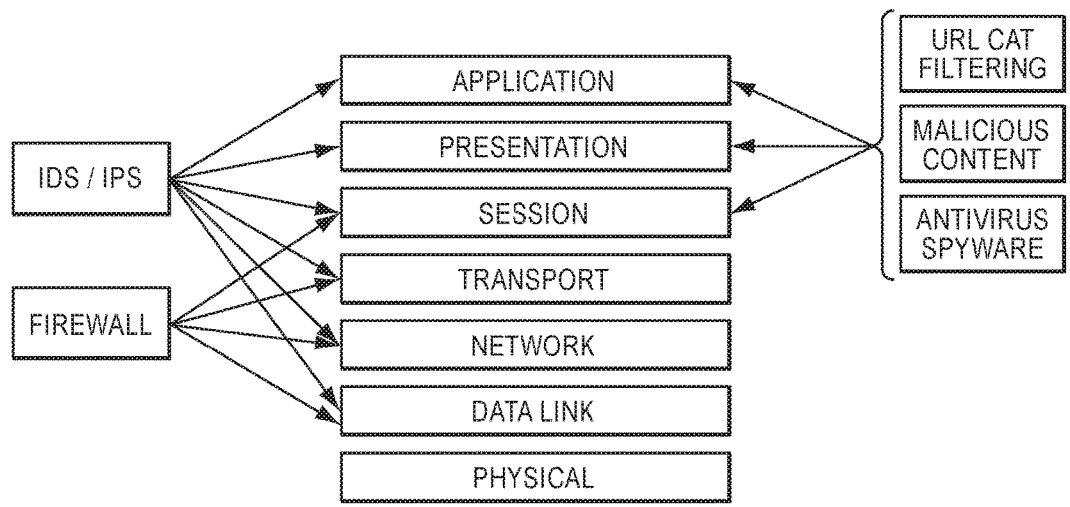
FIG. 8 is a block diagram illustrating details of network security measures relative to the OSI layers.

The mobile security system 345 may be designed as an add-on to existing software security or to replace all security hardware and software on a traveling mobile device. These security applications will preferably operate on different OSI layers to provide maximum security and malicious code detection, as shown in the example system illustrated in FIG. 8. Operating on the lower OSI layers and doing TCP/IP packets analysis only (by screening firewall or router packets) would miss virus and/or worm behavior. Also, many modern viruses use mobile code implemented on a "higher" level than the $7^{th}$ OSI layer (Application—HTTP, FTP, etc.) and therefore cannot be interpreted at the packet layer nor at the application layer. For example, applying antivirus analysis only at the session or transport layer on a malicious Java Script (that is included in an HTML page), trying to match the signature with packets and without understanding the content type (Java Script), will not detect the malicious nature of the Java Script. To offer greater protection, the mobile security system 345 may act as corporate class security appliance and engage different security applications based on the content type and the appropriate OSI layers, (or even a "higher" level if content is encapsulated in the application layer). The mobile security system 345 may be configured to perform content analysis at different OSI layers, e.g., from the packet level to the application level. It will be appreciated that performing deep inspection at the application level is critical to detect malicious content behavior and improve detection of viruses, worms, spyware, Trojan horses, etc. The following software packages may be implemented on the mobile security system 345:

Firewall and VPN—including stateful and stateless firewalls, NAT, packet filtering and manipulation, DOS/DDOS, netfilter, isolate user mobile devices from the internet and run VPN program on the device, etc.

Optional web accelerator and bandwidth/cache management based on Squid.

IDS/IPS—Intrusion detection and prevention system based on Snort. Snort is an open source network intrusion prevention and detection system utilizing a rule-driven language, which combines the benefits of signature, protocol- and anomaly-based inspections.

Antivirus and antispyware based on ClamAV; additional AV and AS engines, e.g., McAfee, Kaspersky, Pandamay, may be offered for additional subscription fees.

Malicious Content Detection—on the fly heuristics that perform content analysis to detect malicious content before having signatures. This will be based on a rule base and updated rules and will be content dependent scanning.

URL Categorization Filtering—based on a commercial engine, such as Surfcontrol, Smart Filters or Websense. May provide around 70 categories of URLs such as gambling, adult content, news, webmail, etc. The mobile device 345 may apply different security policies based on the URL category, e.g., higher restriction and heuristics for Gambling or Adult content web sites, etc.

Figure 4:
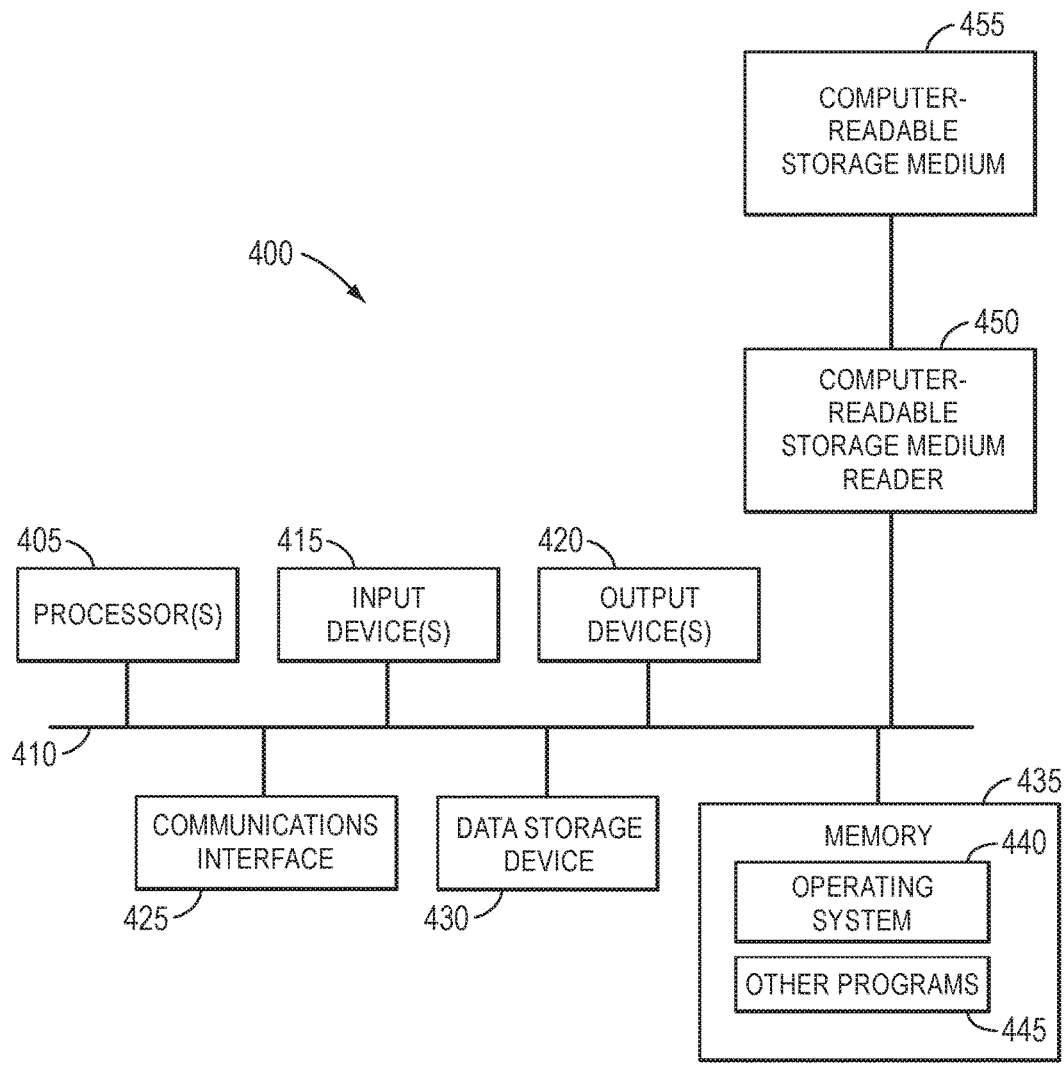
FIG. 4 is a block diagram illustrating details of a computer system in accordance with an embodiment of the present invention.

FIG. 4 is a block diagram illustrating details of an example computer system 400, of which each desktop 305, mobile device 310, network security system 320, mobile security system 345, and security administrator 325 may be an instance. Computer system 400 includes a processor 405, such as an Intel Pentium® microprocessor or a Motorola Power PC® microprocessor, coupled to a communications channel 410. The computer system 400 further includes an input device 415 such as a keyboard or mouse, an output device 420 such as a cathode ray tube display, a communications device 425, a data storage device 430 such as a magnetic disk, and memory 435 such as Random-Access Memory (RAM), each coupled to the communications channel 410. The communications interface 425 may be coupled directly or via a mobile security system 345 to a network such as the internet. One skilled in the art will recognize that, although the data storage device 430 and memory 435 are illustrated as different units, the data storage device 430 and memory 435 can be parts of the same unit, distributed units, virtual memory, etc.

The data storage device 430 and/or memory 435 may store an operating system 440 such as the Microsoft Windows XP, the IBM OS/2 operating system, the MAC OS, UNIX OS, LINUX OS and/or other programs 445. It will be appreciated that a preferred embodiment may also be implemented on platforms and operating systems other than those mentioned. An embodiment may be written using JAVA, C, and/or C++ language, or other programming languages, possibly using object oriented programming methodology.

One skilled in the art will recognize that the computer system 400 may also include additional information, such as network connections, additional memory, additional processors, LANs, input/output lines for transferring information across a hardware channel, the internet or an intranet, etc.

One skilled in the art will also recognize that the programs and data may be received by and stored in the system in alternative ways. For example, a computer-readable storage medium (CRSM) reader 450 such as a magnetic disk drive, hard disk drive, magneto-optical reader, CPU, etc. may be coupled to the communications bus 410 for reading a computer-readable storage medium (CRSM) 455 such as a magnetic disk, a hard disk, a magneto-optical disk, RAM, etc. Accordingly, the computer system 400 may receive programs and/or data via the CRSM reader 450. Further, it will be appreciated that the term "memory" herein is intended to cover all data storage media whether permanent or temporary.

Figure 5:
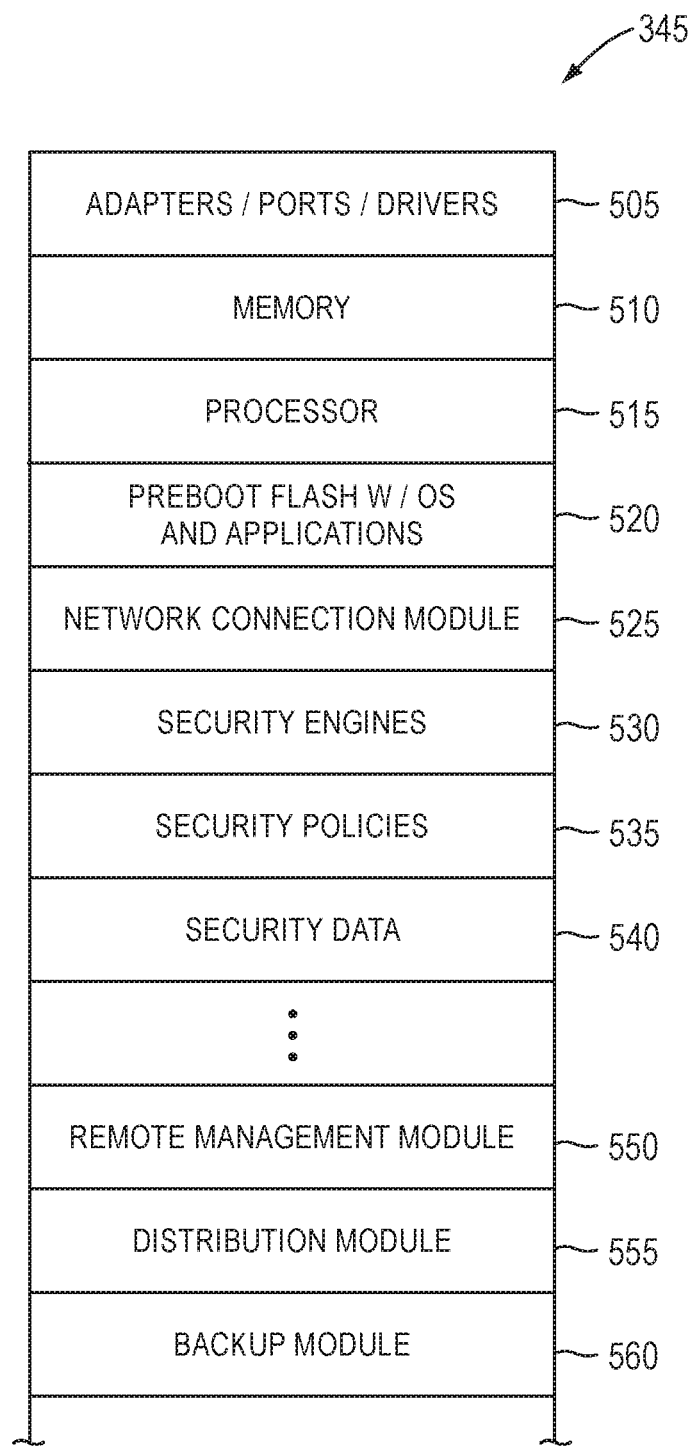
FIGS. 5 and 5A are block diagrams illustrating details of the mobile security system in accordance with an embodiment of the present invention.

FIG. 5 is a block diagram illustrating details of the mobile security system 345 in accordance with an embodiment of the present invention. Mobile security system 345 includes adapters/ports/drivers 505, memory 510, a processor 515, a preboot flash/ROM memory module 520 storing a secure version of the mobile security system's operating system and other applications, network connection module 525, security engines 530, security policies 535, security data 540, remote management module 550, distribution module 555, and backup module 560. Although these modules are illustrated as within the mobile security system 345, one skilled in the art will recognize that many of them could be located elsewhere, e.g., on the security administrator 325 or on third-party systems in communication with the mobile security system 345. The mobile security system 345 may be in a pocket-size, handheld-size or key-chain size housing, or possibly smaller. Further, the mobile security system 345 may be incorporated within the mobile device 310.

The adapters/ports/drivers 505 include connection mechanisms (including software, e.g., drivers) for USB, Ethernet, WiFi, WiMAX, GSM, CDMA, BlueTooth, PCMCIA and/or other connection data ports on the mobile security system 345. In one embodiment, the adapters/ports/drivers 505 may be capable of connection to multiple devices 310 to provide network security to the multiple devices 310.

Memory 510 and processor 515 execute the operating system and applications on the mobile security system 345. In this example, the preboot flash 520 stores the operating system and applications. At boot time, the operating system and applications are loaded from the preboot flash 520 into memory 510 for execution. Since the operating system and applications are stored in the preboot flash 520, which cannot be accessed during runtime by the user, the operating system and applications in the preboot flash 520 are not corruptible. Should the copy of the operating system and applications in memory 510 be corrupted, e.g., by malicious code, the operating system and applications may be reloaded into the memory 510 from the preboot flash 520, e.g., upon restart. Although described as stored within the preboot flash 520, the OS and applications can be securely stored within other read-only memory devices, such as ROM, PROM, EEPROM, etc.

Figure 5A:
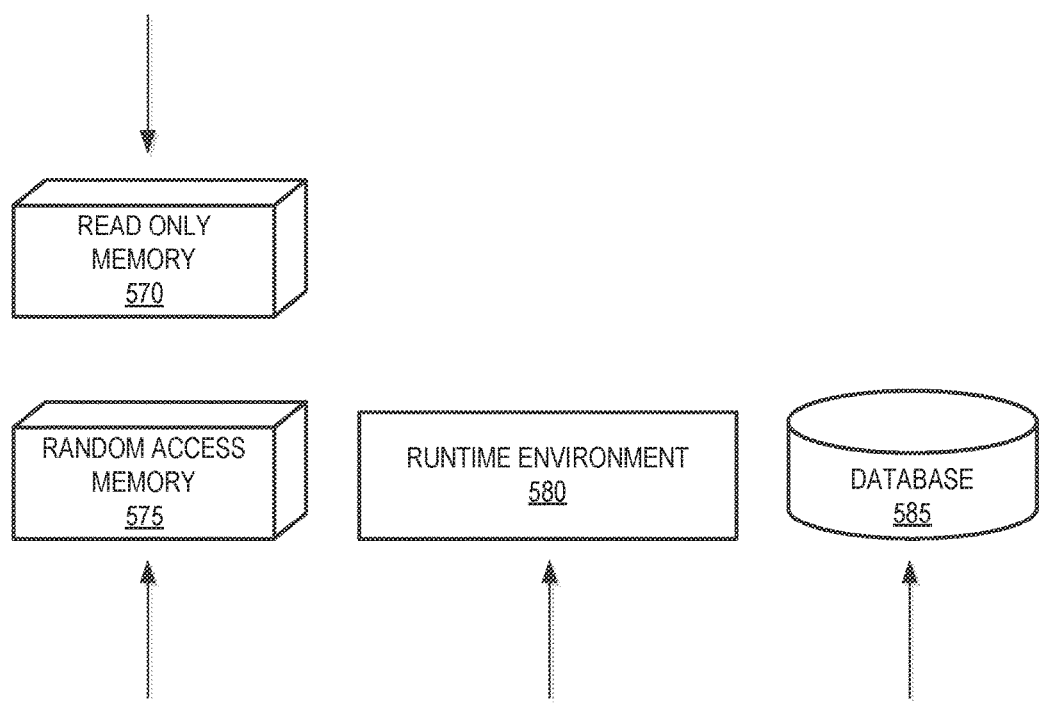

As shown in FIG. 5A, memory (including memory 510 and preboot flash 520) on the mobile security system 345 may be divided into the following zones: read only memory 570; random access memory 575 for storing a copy of the OS, kernel and security applications; runtime environment 580; and database 585 for storing application data, log files, etc. Upon each "hard" restart, the boot loader (resident in read only memory 570) of the mobile security system 345 copies the kernel and security applications (a fresh unchanged copy) from read only memory 570 to random access memory 575. This causes a clean version of the OS and applications to be loaded into random access memory 575 each time. That way, if a special attack on mobile security system 345 is developed, the attack will be unable to infect the system, since the OS and applications are precluded from accessing read only memory 570 during runtime. Further, any attack that does reach memory 510 will be able to run only once and will disappear upon a hard restart. A triggering mechanism may be available to restart the mobile security system 345 automatically upon infection detection.

The network connection module 525 enables network connection, e.g., to the internet 330 or the intranet 315 via network communication hardware/software including WiFi, WiMAX, CDMA, GSM, GPRS, Ethernet, modem, etc. For example, if the mobile device 310 wishes to connect to the internet 330 via a WiFi connection, the adapters/ports/drivers 505 may be connected to the PCI port, USB port or PCMCIA port of the mobile device 310, and the network connection module 525 of the mobile security system 345 may include a WiFi network interface card for connecting to wireless access points. Using the network connection module 425, the mobile security system 345 may communicate with the network as a secure gateway for the mobile device 310. Other connection architectures are described in FIGS. 10A-10C.

The security engines 530 execute security programs based on the security policies 535 and on security data 540, both of which may be developed by IT managers. Security engines 530 may include firewalls, VPN, IPS/IDS, antivirus, anti-spyware, malicious content filtering, multilayered security monitors, Java and bytecode monitors, etc. Each security engine 530 may have dedicated security policies 535 and security data 540 to indicate which procedures, content, URLs, system calls, etc. the engines 530 may or may not allow. The security engines 530, security policies 535 and security data 540 may be the same as, a subset of, and/or developed from the engines, policies and data on the network security system 320.

To provide a higher security level provided by antivirus and antispyware software, the security engines 530 on each mobile security system 345 may implement content analysis and risk assessment algorithms. Operating for example at OSI Layer 7 and above (mobile code encapsulated within Layer 7), these algorithms may be executed by dedicated High Risk Content Filtering (HRCF) that can be controlled by a rules engine and rule updates. The HRCF will be based on a powerful detection library that can perform deep content analysis to verify real content types. This is because many attacks are hidden within wrong mime types and/or may use sophisticated tricks to present a text file type to a dangerous active script or ActiveX content type. The HRCF may integrate with a URL categorization security engine 530 for automatic rule adjustment based on the URL category. In one embodiment, when the risk level increases (using the described mechanism) the mobile security system 345 may automatically adjust and increase filtering to remove more active content from the traffic. For example, if greater risk is determined, every piece of mobile code, e.g., Java script, VB script, etc. may be stripped out.

Three aspects for integration with corporate policy server legacy systems include rules, LDAP and active directory, and logging and reporting as discussed below. In one embodiment, a policy import agent running on the security administrator 325 will access the rule base of Checkpoint Firewall-1 and Cisco PIX Firewalls and import them into a local copy. A rule analysis module will process the important rules and will offer out-of-the-box rules and policies for mobile security systems 345. This proposed policy will offer all mobile security systems 345 a best fit of rules that conform the firewall policy of the enterprise 340. The agent will run periodically to reflect any changes and generate updates for mobile security system 345 policies 535. The LDAP and Active Directory may be integrated with the directory service to maintain mobile security system 345 security policies 535 that respond to the enterprise's directory definitions. For example, a corporate policy for LDAP user Group "G" may automatically propagate to all mobile security systems 345 in "G" group. Mobile security system 345 local logs and audit trails may be sent in accordance to a logging and reporting policy to a central log stored at the security administrator 325. Using a web interface, IT may be able to generate reports and audit views related to all mobile device 310 users, their internet experiences, and attempts to bring infected devices back to the enterprise 340. IT will be able to forward events and log records into legacy management systems via SYSLOG and SNMP Traps.

The security engines 530 may perform weighted risk analysis. For example, the security engine 530 may analyze HTTP, FTP, SMTP, POP3, IM, P2P, etc. including any traffic arriving from the internet 330. The security engine 530 may assign a weight and rank for every object based on its type, complexity, richness in abilities, source of the object, etc. The security engine 530 may assign weight based on the source using a list of known dangerous or known safe sources. The security engine 530 may assign weight to objects based on the category of the source, e.g., a gambling source, an adult content source, a news source, a reputable company source, a banking source, etc. The security engine 530 may calculate the weight, and based on the result determine whether to allow or disallow access to the content, the script to run, the system modification to occur, etc. The security engine 530 may "learn" user content (by analyzing for a predetermined period of time the general content that the user accesses) and accordingly may create personal content profiles. The personal content profile may be used to calibrate the weight assigned to content during runtime analysis to improve accuracy and tailor weighted risk analysis for specific user characteristics.

In some embodiments, the security engines 530, security policies 535 and security data 540 may enable bypassing the mobile security system 345. The security policy 535, set by the security administrator 325, may include a special attribute to force network connection through the mobile security system 325 when outside the trusted enterprise 340. Thus, if this attribute is set "on," when a mobile device 310 attempts to connect to the internet 330 without the mobile security system 345 and not from within the trusted enterprise 340, all data transfer connections including LAN connection, USB-net, modem, Bluetooth, WiFi, etc. may be closed. The mobile device 310 may be totally isolated and unable to connect to any network, including the internet 330.

Figure 6:
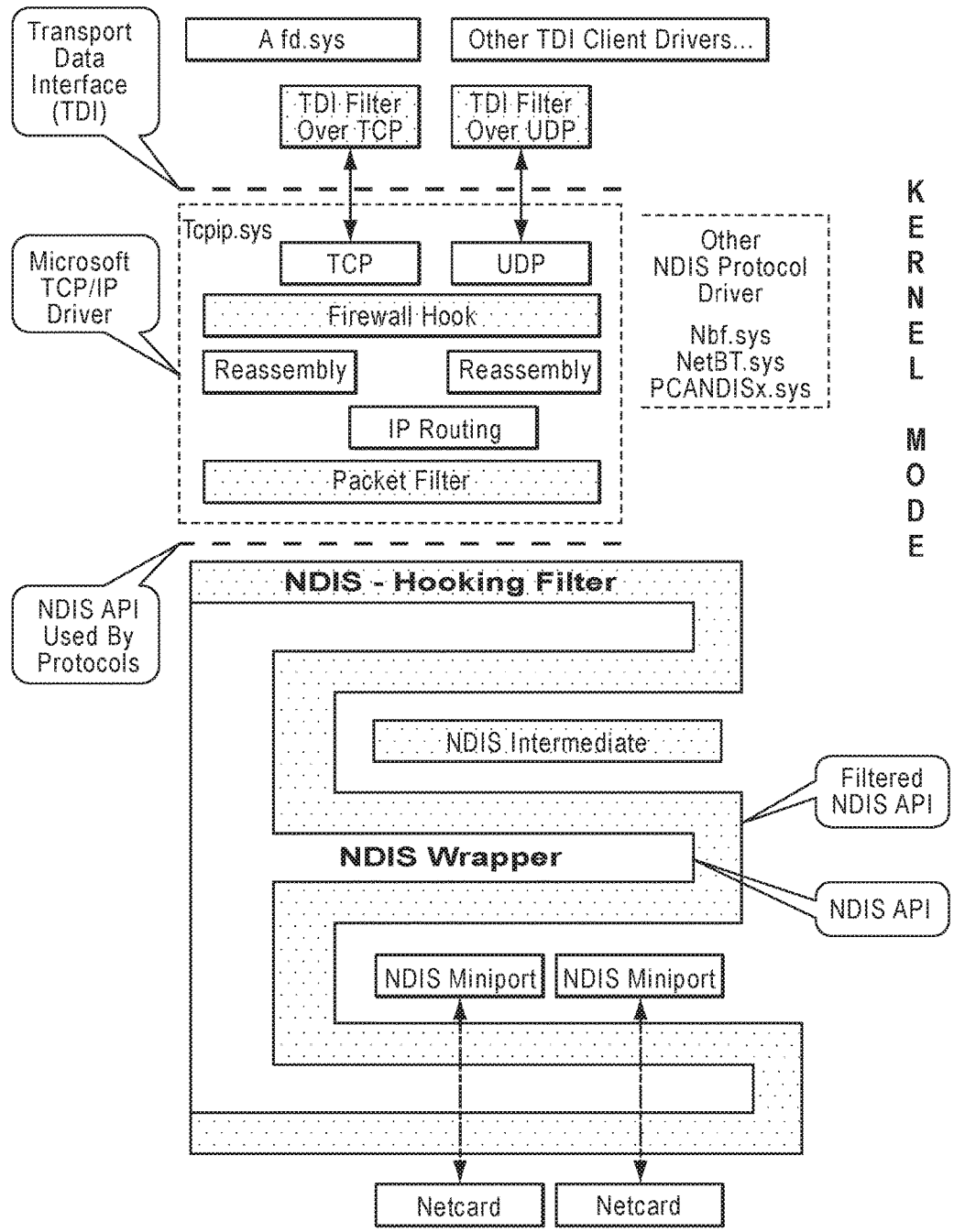
FIG. 6 is a block diagram illustrating details of the mobile security system in accordance with a Microsoft Windows' embodiment.

In one embodiment, to enable this, when first connecting the mobile security system 345 to the mobile device 310 using for example the USB cable (for both power and USB connection creation), the USB plug & play device driver will be sent into the mobile device 310. The installed driver may be "Linux.inf" which allows a USB-net connection for the mobile security system 345. This connection allows the mobile security system 345 to access the internet 330 via the USB port and using the mobile device 310 network connection plus additional code ("the connection client"). In a Windows example, the connection client may be installed at the NDIS level of the mobile device 310 above all the network interface cards of every network connection as shown in FIG. 6. The implementation will be as an NDIS Intermediate (IM) Driver or NDIS-Hooking Filter Driver. Both implementations may be at the kernel level, so that an end user cannot stop or remove it. When starting the mobile device 310, the connection client may attempt to connect to the security administrator 325 or the network security system 320 locally within the trusted enterprise 340. If the node is not found (finding via VPN is considered as not found in local LAN), the connection client will assume it is working from outside the trusted enterprise 340 and expects to find the mobile security system 345 connected, e.g., via USB-net or other connection mechanism. If the mobile security system 345 is not found, the connection client may avoid any communication to any network connection. By a policy definition, this behavior can be modified to allow communication to the enterprise 340 via VPN installed in the mobile device 310. Similarly, in case of a mobile device system 345 failure, all traffic may be disabled, except for the VPN connection into the enterprise 340.

It will be appreciated that NDIS is one possible implementation of intercepting traffic at the kernel level. For example, in another embodiment, the system may hook Winsock or apply other ways that may be in future Windows versions.

In an embodiment where the mobile security system 345 supports multiple mobile devices 310, the security engines 530, security policies 535 and security data 540 may be different for each mobile device 310 (e.g., based on for example user preferences or IT decision). Alternatively, it can apply the same engines 530, policies 535 and data 540 for all connected devices 310.

The remote management module 550 enables communication with security administrator 325 (and/or other security administrators), and enables local updating of security engines 530, security policies 535, security data 540 including signatures and other applications. In one embodiment, modification to the security policies 535 and data 540 can be done by the security administrator 325 only. The remote management module 550 of the mobile security system 345 may receive updates from an update authorities device (UAD), e.g., on the security administrator 325 via a secured connection. A UAD may operate on an update server at a customer IT center located on the internet 330 to forward updates to mobile security systems 345 that possibly do not belong to an enterprise 540 in charge of managing updates. A UAD may operate on a mobile security system 345. Security engine 530 updates may modify the antivirus engine DLL, etc. OS and security application updates may be implemented only from within the enterprise 540 while connecting to the security administrator 325 and via an encrypted and authenticated connection.

The security administrator 325 can modify URL black and white lists for remote support to traveling users. In case of false positives, the security administrator 325 may allow access to certain URLs, by bypassing the proactive heuristics security but still monitoring by firewall, antivirus, IPS/IDS, etc. Additional remote device-management features may enable the security administrator 325 to perform remote diagnostics, access local logs, change configuration parameters, etc. on the mobile security system 345. The security administrator 325 may delegate tasks to a helpdesk for support.

Figure 7:
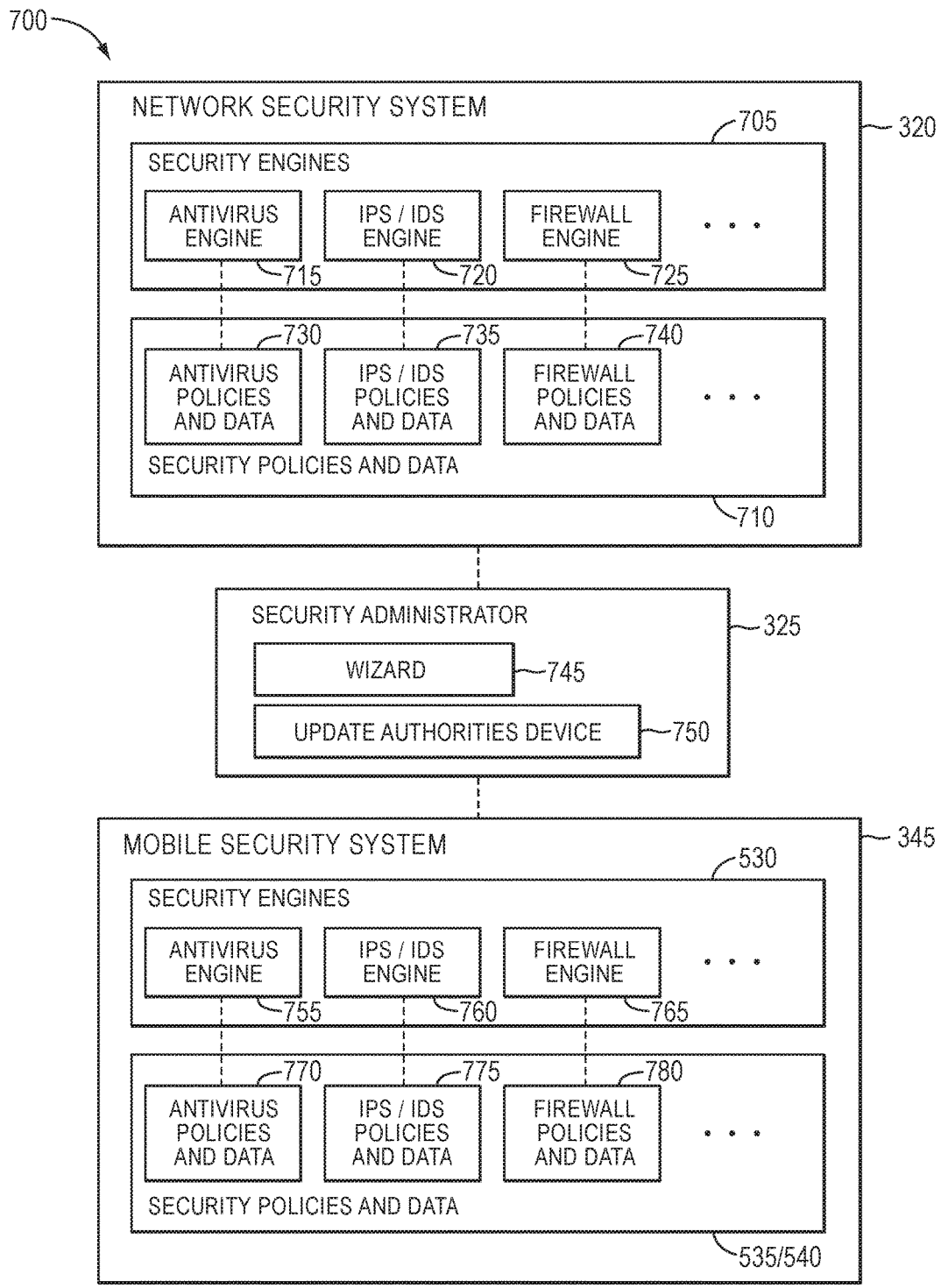
FIG. 7 is a block diagram illustrating details of a smart policy updating system in accordance with an embodiment of the present invention.

The remote management module 550 may communicate with a wizard (e.g., wizard 745), which may be on the security administrator 325, as illustrated in FIG. 7, or on another system. Details of the wizard 745 and details of the communication schemes between the remote management module 550 and the wizard 745 are described below with reference to FIG. 7.

The distribution module 555 enables distribution of updates, e.g., security policy 535 updates including rule updates, security data 540 updates including signature updates, security engine 530 updates, application/OS updates, etc. by the mobile security system 345 to N other mobile security systems 345. A routing table identifying the N other mobile security systems 345 to whom to forward the updates may be provided to the distribution module 555 to enable system 345 to system 345 communication. Updates may be implemented according to policies set by the security administrator 325. When forwarding updates, the distribution module 555 acts as a UAD.

Each mobile security system 345 may obtain its routing table with security information updates, periodically, at predetermined times, upon login, etc. The routing tables may be maintained on a server, e.g., the security administrator 325 or another mobile security system 345. In one embodiment, the mobile security systems 345 may contact the server to retrieve the routing tables. Alternatively, the server may push the routing tables to the mobile security systems 345.

Figure 9:
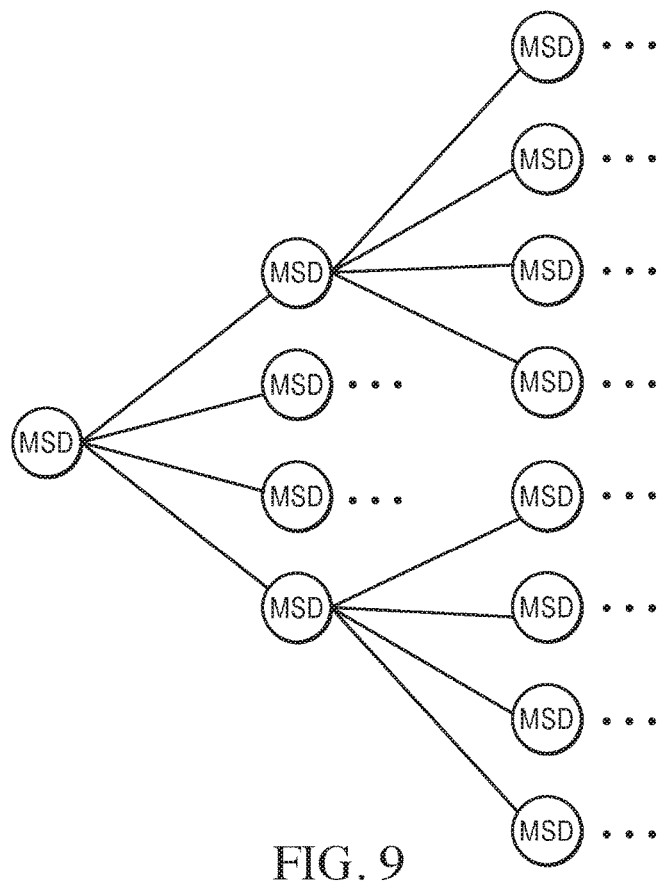
FIG. 9 is a block diagram illustrating details of the communication technique for spreading security code to the mobile security systems.

The distribution module 555 may enable rapid updates as shown in FIG. 9. Currently, all commercial antivirus products available do not update devices faster than viruses spread. To assure that a new virus attack does not spread faster than for example signature updates, each mobile security system 345 may be an active UAD. In one embodiment, as shown in FIG. 9, each mobile security system 345 is responsible for forwarding the signature updates to four other devices 345. As one skilled in the art will recognize, all devices 345 need to forward to the same number of other devices 345. Multiple devices 345 may be responsible for forwarding to the same device 345. When necessary, offline devices 345 being activated may poll the server, e.g., the security administrator 325, for routing table updates. Many other updating techniques are also possible.

The backup module 560 may constantly backup image and changes of the boot sector and system files of the mobile device 310 into the flash memory 520 or into another persistent memory device. That way, in case of major failure, including a loss of the system or boot sector of the mobile device 310, the mobile security system 345 may be identified as a CD-ROM during reboot and may launch the backup module (or separate program) to restore the boot sector and system files on the mobile device 310, thereby recovering the mobile device 310 without the need for IT support. In an embodiment where the network security system 345 supports multiple mobile devices 310, the backup module 560 may contain separate boot sector and system files for each of the mobile devices 310, if different.

FIG. 7 is a block diagram illustrating details of a smart policy updating system 700 in accordance with an embodiment of the present invention. System 700 includes the security administrator 325 coupled to the network security system 320 and to the mobile security system 345. The network security system 320 includes security engines 705, including an antivirus engine 715, an IPS/IDS engine 720, a firewall engine 725, and other security engines. The network security system 320 also includes security policies and data 710, including antivirus policies and data 730, IPS/IDS policies and data 735, firewall policies and data 740, and other policies and data. Similarly, the mobile security system 345 includes an antivirus engine 755, an IPS/IDS engine 760, a firewall engine 765, and other engines. The mobile security system 345 also includes security policies and data 535/540, including antivirus security policies and data 770, IPS/IDS security policies and data 775, firewall security policies and data 780, and other security policies and data.

The security administrator 325 includes a wizard 745 for enabling substantially automatic initial and possibly dynamic setup of the security engines 530, security policies 535 and security data 540 on the mobile security system 345. In one embodiment, the wizard 745 may automatically load all security engines 705 and policies and data 710 of the network security system 320 as the security engines 530 and policies and data 535/540 on the mobile security system 345. In another embodiment, the wizard 745 may include all security engines 705 and policies and data 710 except those known to be irrelevant, e.g., those related to billing software used by accounting, those relating to web software running only on the web servers, etc. In another embodiment, the engines 530 would need to be loaded by an IT manager, and would not be loaded automatically by the wizard 745.

In one embodiment, the wizard 745 may determine whether the mobile security system 345 requires a particular security engine 530, e.g., an antivirus engine 755, IPS/IDS engine 760, firewall engine 765, etc. If so determined, then the wizard 745 would load the engine 530 onto the mobile security system 345. The wizard 745 would then determine which policies and data sets, e.g., some for antivirus engine 755, some for the IPS/IDS engine 760, some for the firewall engine 765, etc. are important to the mobile security system 345. The wizard 745 will then determine which of the antivirus policies and data 730 on the network security system 320 are relevant to the antivirus policies and data 770 on the mobile security system 345, which of the IPS/IDS policies and data 735 on the network security system 320 are relevant to the IPS/IDS policies and data 775 on the mobile security system 345, which of the firewall policies and data 740 on the network security system 320 are relevant to the firewall policies and data 780 on the mobile security system 345, and which of the other policies and data on the network security system 320 are relevant to the policies and data on the mobile security system 345. As stated above, the wizard 745 may determine that all security engines 705 or just a subset are needed on the mobile security system 345. The wizard 745 may determine that all policies and data 710 for a given engine type or just a subset should be forwarded. The wizard 745 may determine which relevant policies and data 710 should be forwarded to the mobile security system 345 based on rules developed by an IT manager, based on item-by-item selection during the setup procedure, etc. Alternative to the wizard 745, an IT manager can setup the engines 530 and policies and data 535/540 on the mobile security system 345 without the wizard 745.

The security administrator 325 may also include an update authorities device 750. The update authorities device 750 may obtain security system updates (e.g., signature updates) and may send the updates to the network security system 320 and to the mobile security system 345. One skilled in the art will recognize that the updates to the network security system 320 and the updates to the mobile security system 345 need not be the same. Further, the update authorities device 750 may obtain the updates from security managers, security engine developers, antivirus specialists, etc. The update authorities device 750 may forward the updates to all network security systems 320 and all mobile security systems 345, or may forward routing tables to all mobile security systems 345 and the updates only to an initial set of mobile security systems 345. The initial set of mobile security systems 345 may forward the updates to the mobile security systems 345 identified in the routing tables in a P2P manner, similar to the process illustrated in FIG. 9. As stated above, each mobile security system 345 operating to forward updates is itself acting as an update authorities device 750.

Other applications may be included on the mobile security system 345. For example, add-on applications for recurring revenue from existing customers may include general email, anti-spam, direct and secured email delivery, information vaults, safe skype and other instant messaging services, etc.

Email Security and Anti-spam—implementation of mail relay on mobile security systems 345 (including the web security engine above) and a local spam quarantine (based on SendMail or similar process) may implement a complete mail security suite (SMTP and POP3) including anti-spam with real time indexing (via online web spam quarries). Users may have access to the quarantine to review spam messages, release messages, modify and custom spam rules, etc., via a web interface.

Direct and Secured Email Delivery based on mail relay will allow the mobile security system 345 to send user email directly from one mobile security system 345 to another mobile security system 345 without using in route mail servers. This allows corporate users to send emails that need not travel in the internet, thus leaving trace and duplicates on different unknown mail servers in route. This combined with the ability to use a secured pipe between two mobile security systems is valuable to corporations. Without such methodology, people could trace emails exchange without accessing to the enterprise's mail server, by tracking down copies in intermediate mail servers that were used to deliver the messages.

Information Vault—Application to encrypt and store end user information on the mobile security system 345 may be available only to authorized users via a web interface and a web server implemented on every mobile security system 345 (e.g., BOA, Apache, etc.).

Safe Skype and Other IM—implementing an instant messaging client on the mobile security system 345 can guarantee that the instant messaging system or P2P application has no access to data on the mobile device 310. Adding a chipset of AC/97 to provide a sound interface on the mobile security system 325 could allow users to talk and receive calls directly from/to the mobile security system 325.

Although not shown, a small battery may be included with the mobile security system 345. This battery may be charged by the USB connection during runtime or using the power adapter at any time. The battery may guarantee proper shutdown, e.g., when user disconnects the USB cable from the mobile security system 345. It will be signaled by the system which will launch applications and system shutdown. This will ensure a proper state of the file system and flashing open files buffers.

A multi-layered defense and detection abilities is required. This may be done by a special code that is constantly monitoring the scanning result by different systems (antivirus, IDS/IPS, firewall, antispyware, URL category, etc.) and at different levels to build a puzzle and identify an attack even if it's not recognized by each of the individual subsystems. By doing this, the mobile security system 345 will maintain and in some cases even improve the security level provided within the enterprise 540.

One available benefit of the mobile security system 345 is its ability to enforce the policy of the enterprise 540 on the end user while they are traveling or working from home. Since the mobile security system 345 uses similar security engines and policy as when connected from within the enterprise 540 and since the end user cannot access the internet 330 without it (except via VPN connection into the enterprise 546), IT may be capable of enforcing its security policy beyond the boundaries of the enterprise 540. The OS may be under the entire supervision of IT, while the mobile security system 345 OS acts as an end user OS under his control. This resolves the problems of who controls what and how security and productivity face minimal compromise.

A standalone version of the mobile security system 345 may offer the same functionality, and may provide a local management interface via web browser. Attractive to home users and small offices that lack an IT department, the mobile security system 345 enables the end user to launch a browser, connect to the mobile security system 345, set the different policies (update policy, security rules, etc.) including modifying the white and black URL lists, etc. There is also an opportunity to provide end users with a service of remote management of the mobile security systems 345 by subscription.

Figure 10A:
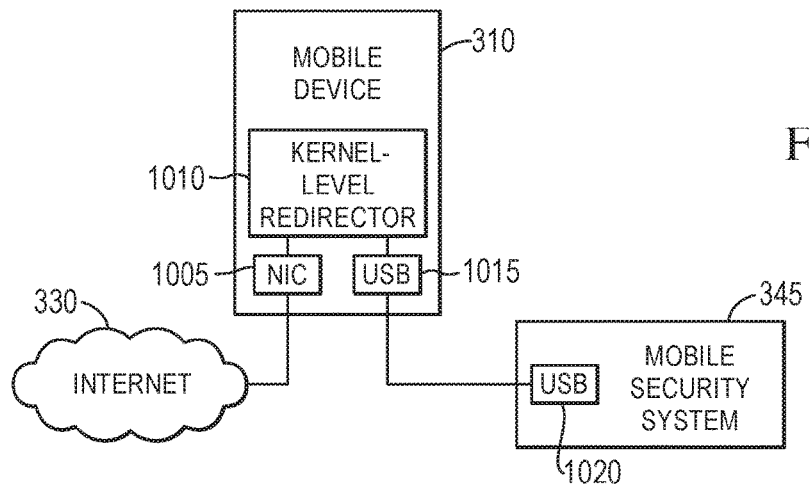
FIGS. 10A-10C are block diagrams illustrating various architectures for connecting a mobile device to a mobile security system, in accordance with various embodiments of the present invention.
Figure 10B:
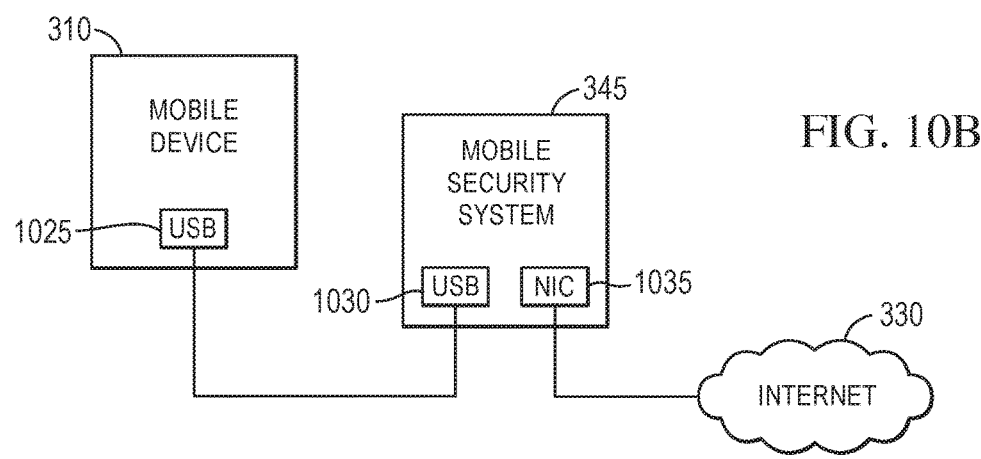
Figure 10C:
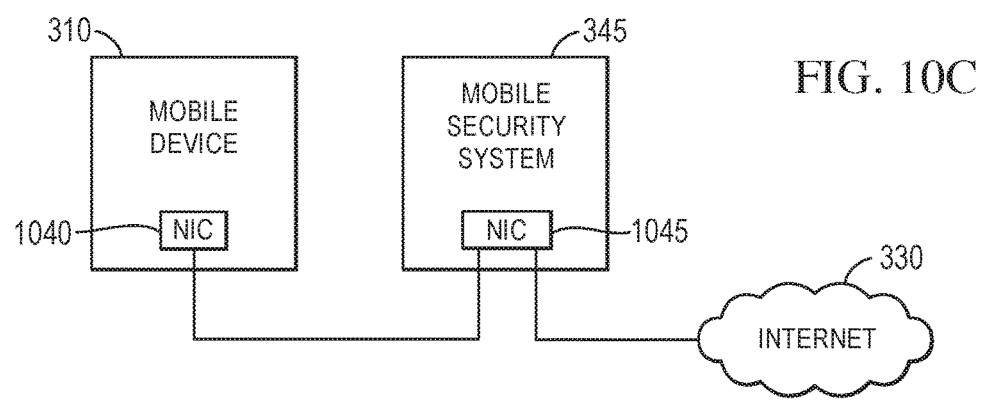

FIGS. 10A, 10B and 10C illustrate three example architectures of connecting a mobile security system 345 to a mobile device 310, in accordance with various embodiments of the present invention. In FIG. 10A, the mobile device 310 is coupled to the mobile security system 345 via USB connections 1015 and 1020 and is coupled to the internet 330 via a NIC card 1005. The mobile device 310 receives internet traffic from the internet 330 via its NIC card 1005. A kernel-level redirector 1010 (e.g., via NDIS, Winsock, etc.) on the mobile device 310 automatically redirects the internet traffic via the USB connections 1015 and 1020 to the mobile security system 345, which scans, cleans and returns the cleaned internet traffic to the mobile device 310 via the USB connections 1015 and 1020. In FIG. 10B, the mobile device 310 is coupled to the mobile security system 345 via USB connections 1025 and 1030. The mobile security system 345 includes a NIC card 1035 for receiving internet traffic from the internet 330. The mobile security system 345 scans, cleans and forwards the internet traffic via the USB connections 1025 and 1030 to the mobile device 310. In FIG. 10C, the mobile device 310 is coupled to the mobile security system 345 via NIC cards 1040 and 1045. The mobile security system 345 receives internet traffic from the internet 330 via its NIC card 1045. The mobile security system 345 scans, cleans and forwards the internet traffic wirelessly via the NIC cards 1040 and 1045 to the mobile device 310. Other connection architectures are also possible.

The foregoing description of the preferred embodiments of the present invention is by way of example only, and other variations and modifications of the above-described embodiments and methods are possible in light of the foregoing teaching. Although the network sites are being described as separate and distinct sites, one skilled in the art will recognize that these sites may be a part of an integral site, may each include portions of multiple sites, or may include combinations of single and multiple sites. The various embodiments set forth herein may be implemented utilizing hardware, software, or any desired combination thereof. For that matter, any type of logic may be utilized which is capable of implementing the various functionality set forth herein. Components may be implemented using a programmed general purpose digital computer, using application specific integrated circuits, or using a network of interconnected conventional components and circuits. Connections may be wired, wireless, modem, etc. The embodi-

The invention claimed is:

1. A security system, comprising:
   security system memory; and
   a security system processor configured to:
      store in the security system memory at least a portion of security code, at least a portion of a security policy, and at least a portion of security data,
         the at least a portion of the security code, the at least a portion of the security policy, and the at least a portion of the security data configured to provide security services to a mobile device coupled to the security system, the mobile device having at least one mobile device processor different than the security system processor of the security system,
         the at least a portion of the security code, the at least a portion of the security policy, and the at least a portion of the security data being managed by one or more information technology (IT) administrators using an IT administrator system on a trusted enterprise network, the at least a portion of the security code, the at least a portion of the security policy, and the at least a portion of the security data being configured based on one or more policies implemented by the one or more IT administrators on the trusted enterprise network,
      store in the security system memory at least a portion of remote management code configured to process an update command, the update command being an instruction to update at least one of the security code, the security policy, or the security data based on one or more revised policies implemented by the one or more IT administrators on the trusted enterprise network;
      receive a particular update command to update a particular one of the security code, the security policy, or the security data, the particular update command having originated from the IT administrator system and having been forwarded to the security system; and
      execute the update command using the remote management code to update the particular one of the security code, the security policy, or the security data.

2. The security system of claim 1, wherein the security system is on a separate appliance removably coupled to the mobile device.

3. The security system of claim 1, wherein the security code, the security policy, and the security data provide gateway-level security services.

4. The security system of claim 1, wherein the security code, the security policy, and the security data provide firewall security services.

5. The security system of claim 1, wherein the security code, the security policy, and the security data provide malware protection security services.

6. The security system of claim 1, wherein the security code, the security policy, and the security data provide content-based security services.

7. The security system of claim 1, wherein the IT administrator system includes an update authorities device configured to automatically generate and send update commands.

8. The security system of claim 1, wherein the security code, the security policy, and the security data are configured to mirror security policies of a gateway on the trusted enterprise network.

9. The security system of claim 1, wherein the particular update command includes a command to update configuration parameters of one of the security code, the security policy, or the security data of the security system.

10. A method, comprising:
    storing in a security system memory of a security system at least a portion of security code, at least a portion of a security policy, and at least a portion of security data,
       the at least a portion of the security code, the at least a portion of the security policy, and the at least a portion of the security data configured to provide security services to a mobile device coupled to the security system, the mobile device having at least one mobile device processor different than a security system processor of the security system,
       the at least a portion of the security code, the at least a portion of the security policy, and the at least a portion of the security data being managed by one or more information technology (IT) administrators using an IT administrator system on a trusted enterprise network, the at least a portion of the security code, the at least a portion of the security policy, and the at least a portion of the security data being configured based on one or more policies implemented by the one or more IT administrators on the trusted enterprise network;
    storing in the security system memory at least a portion of remote management code configured to process an update command, the update command being an instruction to update at least one of the security code, the security policy, or the security data based on one or more revised policies implemented by the one or more IT administrators on the trusted enterprise network;
    receiving a particular update command to update a particular one of the security code, the security policy, or the security data, the particular update command having originated from the IT administrator system, the particular update command having been forwarded to the security system; and
    executing the update command using the remote management code to update the particular one of the security code, the security policy, or the security data.

11. The method of claim 10, further comprising coupling the security system to the mobile device.

12. The method of claim 10, further comprising using the security code, the security policy, and the security data to provide gateway-level security services.

13. The method of claim 10, further comprising using the security code, the security policy, and the security data to provide firewall security services.

14. The method of claim 10, further comprising using the security code, the security policy, and the security data to provide malware protection security services.

15. The method of claim 10, further comprising using the security code, the security policy, and the security data to provide content-based security services.

16. The method of claim 10, wherein the particular update command originates from an update authorities device on the IT administrator system, the update authorities device being configured to automatically generate and send update commands.

17. The method of claim 10, further comprising mirroring the security code, the security policy, and the security data relative to security policies of a gateway on the trusted enterprise network.

18. The method of claim 10, wherein the particular update command includes a command to update configuration parameters of one of the security code, the security policy, or the security data of the security system.

* * * * *

(12) INTER PARTES REVIEW CERTIFICATE (3130th)
United States Patent
Touboul

(10) Number: US 9,781,164 K1
(45) Certificate Issued: May 12, 2023

(54) SYSTEM AND METHOD FOR PROVIDING NETWORK SECURITY TO MOBILE DEVICES

(71) Applicant: Shlomo Touboul

(72) Inventor: Shlomo Touboul

(73) Assignee: CUPP COMPUTING AS

Trial Number:

IPR2019-00368 filed Nov. 30, 2018

Inter Partes Review Certificate for:

Patent No.: 9,781,164
Issued: Oct. 3, 2017
Appl. No.: 15/352,553
Filed: Nov. 15, 2016

The results of IPR2019-00368 are reflected in this inter partes review certificate under 35 U.S.C. 318(b).

INTER PARTES REVIEW CERTIFICATE
U.S. Patent 9,781,164 K1
Trial No. IPR2019-00368
Certificate Issued May 12, 2023

AS A RESULT OF THE INTER PARTES REVIEW PROCEEDING, IT HAS BEEN DETERMINED THAT:

Claims 1-7, 9-16 and 18 are cancelled.

\* \* \* \* \*